United States Patent
Choi

(10) Patent No.: US 12,523,562 B2
(45) Date of Patent: Jan. 13, 2026

(54) APPARATUS AND METHOD FOR MONITORING HYDROGEN STORAGE SYSTEM OF VEHICLE

(71) Applicants: Hyundai Motor Company, Seoul (KR); Kia Corporation, Seoul (KR)

(72) Inventor: Hae Pin Choi, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 625 days.

(21) Appl. No.: 17/872,931

(22) Filed: Jul. 25, 2022

(65) Prior Publication Data

US 2023/0184613 A1    Jun. 15, 2023

(30) Foreign Application Priority Data

Dec. 10, 2021 (KR) ................ 10-2021-0177075

(51) Int. Cl.
| | |
|---|---|
| *B60L 58/30* | (2019.01) |
| *B60L 3/00* | (2019.01) |
| *G01M 3/00* | (2006.01) |
| *H01M 8/04082* | (2016.01) |
| *H01M 8/04089* | (2016.01) |
| *H01M 8/0432* | (2016.01) |
| *H01M 8/04664* | (2016.01) |

(Continued)

(52) U.S. Cl.
CPC ........... *G01M 3/002* (2013.01); *B60L 3/0053* (2013.01); *B60L 58/30* (2019.02); *H01M 8/04089* (2013.01); *H01M 8/04201* (2013.01); *H01M 8/0432* (2013.01); *H01M 8/04664* (2013.01); *H01M 8/04955* (2013.01); *H01M 2250/20* (2013.01)

(58) Field of Classification Search
CPC ........ G01N 25/72; G01M 3/002; B60L 58/30; B60L 3/0053; H01M 8/04089; H01M 8/04201; H01M 8/0432; H01M 8/04664; H01M 8/04955; H01M 2250/20
See application file for complete search history.

(56) References Cited

U.S. PATENT DOCUMENTS

| | | | |
|---|---|---|---|
| 7,695,838 B2 | 4/2010 | Komachiya et al. | |
| 8,410,946 B2 * | 4/2013 | Ansari | G01M 3/002 340/622 |

(Continued)

FOREIGN PATENT DOCUMENTS

| | | |
|---|---|---|
| CN | 110758062 A | 2/2020 |
| CN | 111332156 A | 6/2020 |

(Continued)

*Primary Examiner* — Peter J Macchiarolo
*Assistant Examiner* — Mireille S Sadate-Moualeu
(74) *Attorney, Agent, or Firm* — Fox Rothschild LLP

(57) ABSTRACT

In one aspect, an apparatus and a method for monitoring a hydrogen storage system of a vehicle to always monitor the hydrogen storage system of the vehicle are provided. The apparatus comprises a first temperature sensor that measures an internal temperature of a hydrogen tank, a second temperature sensor that measures an outdoor temperature, a comparator that determines whether a hydrogen leak occurs based on the result of comparing the internal temperature with the outdoor temperature and outputs a wake-up signal, and a controller that performs failure diagnosis of a hydrogen storage system, when receiving the wake-up signal.

12 Claims, 6 Drawing Sheets

(51) Int. Cl.
  *H01M 8/04955* (2016.01)
  *H01M 8/20* (2006.01)

(56) References Cited

U.S. PATENT DOCUMENTS

| | | | |
|---|---|---|---|
| 10,295,121 B2 * | 5/2019 | Handa | F17C 13/028 |
| 2017/0108396 A1 * | 4/2017 | Takeda | G01M 3/002 |
| 2019/0285503 A1 * | 9/2019 | Takeda | G01M 3/002 |
| 2020/0223318 A1 * | 7/2020 | Campbell | B60L 58/15 |

FOREIGN PATENT DOCUMENTS

| | | | | |
|---|---|---|---|---|
| CN | 112820907 A * | 5/2021 | | H01M 8/04225 |
| JP | 2005-223535 A | 8/2005 | | |
| JP | 2006-083943 A | 3/2006 | | |
| JP | 5108344 B2 | 12/2012 | | |
| KR | 100814526 B1 | 3/2008 | | |
| KR | 10-2021-0024334 A | 3/2021 | | |
| WO | WO-2019169897 A1 * | 9/2019 | | F24F 11/36 |

* cited by examiner

APPARATUS AND METHOD FOR MONITORING HYDROGEN STORAGE SYSTEM OF VEHICLE

CROSS-REFERENCE TO RELATED APPLICATION

This application claims under 35 U.S.C. § 119(a) the benefit of Korean Patent Application No. 10-2021-0177075, filed in the Korean Intellectual Property Office on Dec. 10, 2021, the entire contents of which are incorporated herein by reference.

BACKGROUND

Technical Field of the Disclosure

The present disclosure relates to an apparatus and a method for monitoring a hydrogen storage system of a vehicle to always monitor the hydrogen storage system of the vehicle.

Background

A fuel cell vehicle drives its motor using electricity obtained by reacting hydrogen with oxygen in the air to drive. A fuel cell system, a motor, a battery, a hydrogen storage system, and the like are loaded into such a fuel cell vehicle. A device for monitoring a hydrogen leak in real time, that is, a hydrogen leak sensor is applied to the hydrogen storage system among them.

However, an existing monitoring technology using the hydrogen leak sensor may need separate power configuration and supply in preparation for the case where the vehicle is parking or power supply is stopped and may cause vehicle discharge and degradation in battery life due to continuous power consumption.

SUMMARY OF THE DISCLOSURE

The present disclosure has been made to solve the abovementioned problems occurring in the existing technologies while advantages achieved by the existing technologies are maintained intact.

One aspect of the present disclosure provides an apparatus and a method for monitoring a hydrogen storage system of a vehicle to always monitor an internal state of a hydrogen tank to detect an operation of a thermally activated pressure relief device (TPRD) mounted on the hydrogen tank.

Another aspect of the present disclosure provides an apparatus and a method for monitoring a hydrogen storage system of a vehicle to interwork with a hydrogen storage system when detecting a hydrogen leak due to the TPRD to perform failure diagnosis and a fail-safe reaction.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for monitoring a hydrogen storage system may include a first temperature sensor that is configured to measure an internal temperature of a hydrogen tank, a second temperature sensor that is configured to measure an outdoor temperature, a comparator that is configured to determine whether a hydrogen leak occurs based on the result of comparing the internal temperature with the outdoor temperature and outputs a wake-up signal, and a controller that is configured to perform failure diagnosis of the hydrogen storage system, when receiving the wake-up signal.

The comparator may determine that the hydrogen leak occurs, when a temperature difference between the internal temperature and the outdoor temperature is greater than or equal to a predetermined temperature.

The comparator may determine that the hydrogen leak occurs, when a temperature difference between the internal temperature and the outdoor temperature is greater than a certain factor times the predetermined normal temperature deviation.

The controller may supply power to an electronic part in the hydrogen storage system, when driven by the wake-up signal, and performs the failure diagnosis.

The controller may detect at least one failure among: a leak of hydrogen of the hydrogen tank, an abnormality in temperature of the hydrogen tank, an abnormality in pressure of the hydrogen tank, or occurrence of a change in amount of remaining fuel of the hydrogen tank using sensors, when performing the failure diagnosis.

The controller may output information associated with the detected failure, when detecting the failure, and may prohibit a vehicle from starting.

The controller may record a wake-up history, when not detecting the failure, and may enter a sleep mode.

Each of the first temperature sensor and the second temperature sensor may include a negative temperature coefficient (NTC) element.

According to another aspect of the present disclosure, a method for monitoring a hydrogen storage system may include measuring, by a comparator, an internal temperature of a hydrogen tank and an outdoor temperature using a first temperature sensor and a second temperature sensor, comparing, by the comparator, the internal temperature with the outdoor temperature, determining, by the comparator, whether a hydrogen leak occurs based on the compared result, outputting, by the comparator, a wake-up signal to a controller, when it is determined that the hydrogen leak occurs, and performing, by the controller, failure diagnosis of the hydrogen storage system.

The determining of whether the hydrogen leak occurs may include determining, by the comparator, that the hydrogen leak occurs, when a temperature difference between the internal temperature and the outdoor temperature is greater than or equal to a predetermined temperature.

The determining of whether the hydrogen leak occurs may include determining, by the comparator, that the hydrogen leak occurs, when a temperature difference between the internal temperature and the outdoor temperature is greater than a certain factor times the predetermined normal temperature deviation.

The performing of the failure diagnosis may include supplying, by the controller, power to an electronic part in the hydrogen storage system, when the controller is driven by the wake-up signal, and performing, by the controller, the failure diagnosis.

The performing of the failure diagnosis may include detecting, by the controller, at least one failure among: a leak of hydrogen of the hydrogen tank, an abnormality in temperature of the hydrogen tank, an abnormality in pressure of the hydrogen tank, or occurrence of a change in amount of remaining fuel of the hydrogen tank using sensors and outputting, by the controller, information associated with the detected failure and prohibiting, by the controller, a vehicle to start.

The performing of the failure diagnosis may further comprise recording, by the controller, a wake-up history, when the controller does not detect the failure, and entering, by the controller, a sleep mode.

Other aspects are disclosed infra.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
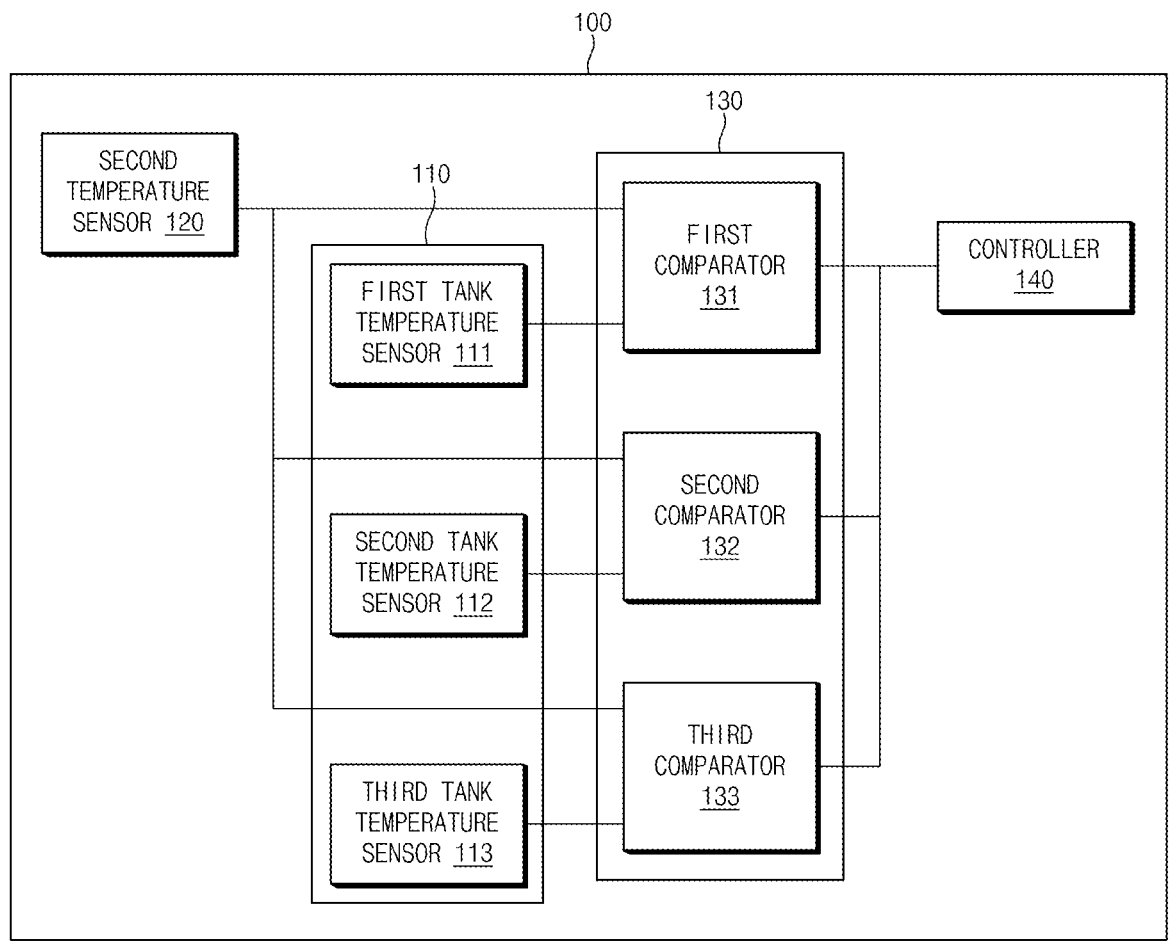
FIG. 1 is a block diagram illustrating a configuration of an apparatus for monitoring a hydrogen storage system according to exemplary embodiments of the present disclosure.

Hereinafter, some exemplary embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Figure 2:
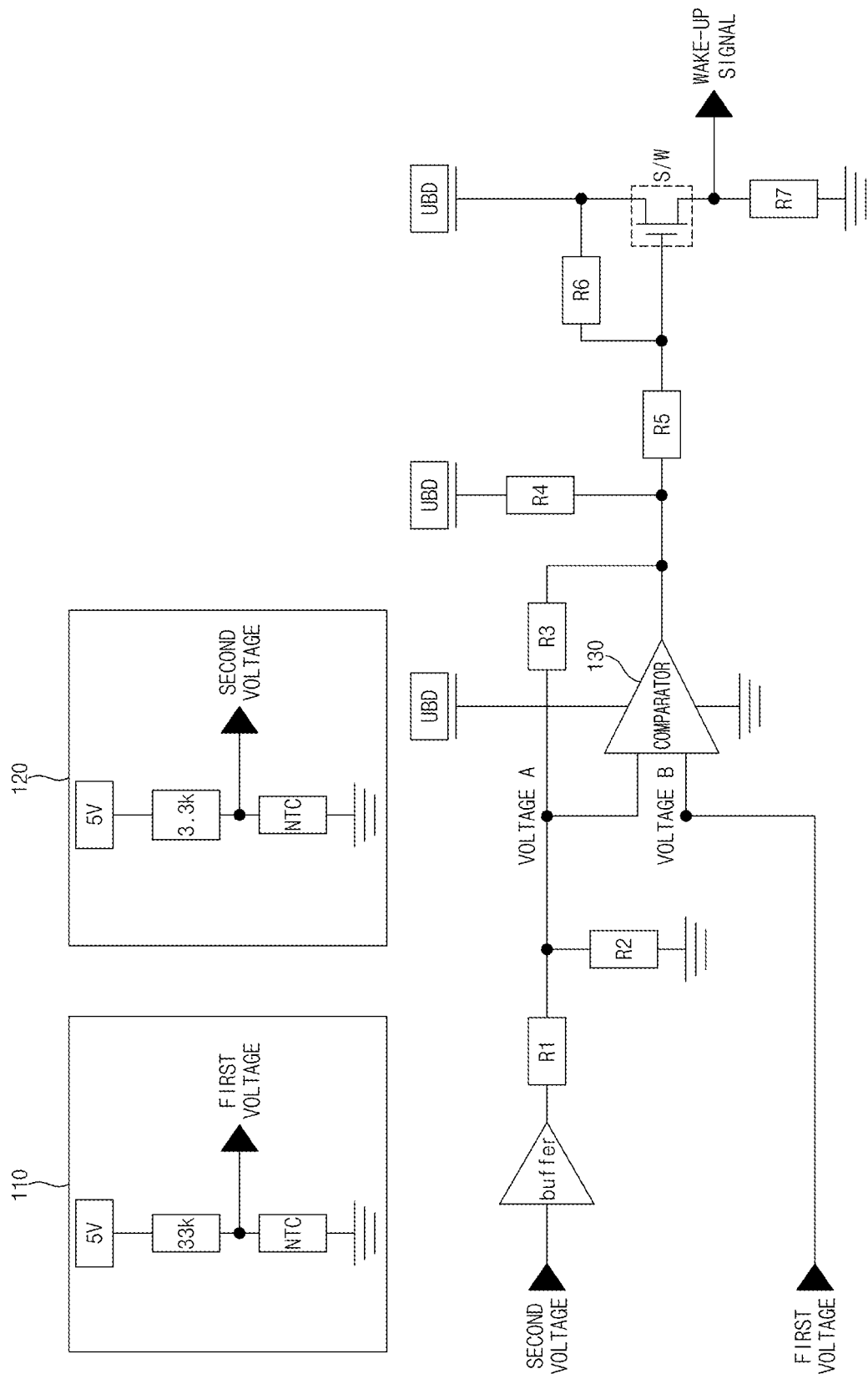
FIG. 2 is a circuit diagram illustrating a comparator circuit according to exemplary embodiments of the present disclosure.

FIG. 1 is a block diagram illustrating a configuration of an apparatus for monitoring a hydrogen storage system according to exemplary embodiments of the present disclosure. FIG. 2 is a circuit diagram illustrating a comparator circuit according to exemplary embodiments of the present disclosure.

An apparatus 100 for monitoring a hydrogen storage system may compare an internal temperature of a hydrogen tank with an air temperature and may detect a massive hydrogen leak due to a TPRD, when the parking is parking or in a situation where power is not supplied, using the fact in that an internal temperature of a hydrogen tank rapidly drops when hydrogen in the hydrogen tank leaks due to the TPRD. In other words, the apparatus 100 for monitoring the hydrogen storage system may detect an operation of the TPRD. The TPRD may be installed at an inlet of the hydrogen tank. The TPRD may be automatically opened when temperature increases to discharge hydrogen gas in the hydrogen tank and relieve pressure, thus preventing explosion of the hydrogen tank.

The apparatus 100 for monitoring the hydrogen storage system may comprise a first temperature sensor 110, a second temperature sensor 120, a comparator 130, and a controller 140.

The first temperature sensor 110 may be mounted on the hydrogen tank to measure an internal temperature of the hydrogen tank. The first temperature sensor 110 may comprise at least one tank temperature sensor for measuring an internal temperature of each hydrogen tank, for example, a first tank temperature sensor 111, a second tank temperature sensor 112, and a third tank temperature sensor 113. The present exemplary embodiment is described as actually measuring the internal temperature of the hydrogen tank, but not limited thereto. The present exemplary embodiment may be implemented to measure a temperature corresponding to the internal temperature.

As shown in FIG. 2, the first temperature sensor 110 may comprise a negative temperature coefficient (NTC) element, a resistor, and the like. The first temperature sensor 110 may output a first voltage (or an internal temperature of the hydrogen tank) measured by the NTC element.

The second sensors 120 may measure an outdoor temperature (or outdoor air temperature) of the vehicle. The second sensors 120 may comprise an NTC element and a resistor. As shown in FIG. 2, the second temperature sensor 120 may output a second voltage (or an outdoor temperature) measured by the NTC element.

The comparator 130 may compare the internal temperature measured by the first temperature sensor 110 with the outdoor temperature measured by the second temperature sensor 120. The comparator 130 may comprise at least one comparator 131 to 133. For example, the comparator 130 may comprise the first comparator 131 for comparing the temperature measured by the first tank temperature sensor 111 with the temperature measured by the second temperature sensor 120, the second comparator 132 for comparing the temperature measured by the second tank temperature sensor 112 with the temperature measured by the second temperature sensor 120, the third comparator 133 for comparing the temperature measured by the third tank temperature sensor 113 with the temperature measured by the second temperature sensor 120, and the like.

The comparator 130 may determine whether a hydrogen leak occurs based on the result of comparing the internal temperature with the outdoor temperature. In other words, the comparator 130 may determine whether the TPRD operates based on the result of comparing the internal temperature with the outdoor temperature.

When a temperature difference (or deviation) between the internal temperature and the outdoor temperature meets a predetermined temperature condition, the comparator 130 may determine that the hydrogen leak occurs. When the temperature difference between the internal temperature and the outdoor temperature does not meet the predetermined temperature condition, the comparator 130 may determine that hydrogen leak does not occur. The predetermined temperature condition may be a determination criterion of determining whether a hydrogen leak occurs, which may be a specific temperature value (e.g., 10° C. or 50° F.) set with regard to a characteristic of the NTC element, which measures a temperature, and an outdoor temperature in a region at an extremely low temperature. Furthermore, the predetermined temperature condition may be a certain factor times (e.g., three times) the normal temperature deviation (or reference temperature deviation) level derived through an experiment in advance.

When it is determined that the hydrogen leak occurs, the comparator 130 may output a wake-up signal to drive the controller 140. As an example, when the temperature difference between the internal temperature and the outdoor temperature is generated above a predetermined temperature difference (e.g., 40° C.), the comparator 130 may output "true" or "1" as the wake-up signal. When the temperature difference between the internal temperature and the outdoor temperature is less than the predetermined temperature difference, the comparator 130 may output "false" or "0".

Referring to FIG. 2, a comparison circuit may be composed of the comparator 130 and peripherals, for example, a buffer, resistors R1 to R7, a semiconductor switch S/W, and the like. The comparator 130 may receive a first voltage output from the first temperature sensor 110 and a second voltage output from the second temperature sensor 120. The comparator 130 may compare a reference voltage determined by the second voltage, that is, voltage A, with the first voltage, that is, voltage B. When a difference (or a deviation) between voltage A and voltage B is generated above a predetermined voltage value, the comparator 130 may output a wake-up signal.

The controller 140 may be a hydrogen management unit (I-IMU) which manages a hydrogen storage system of the vehicle. The controller 140 may comprise at least one processor and may further comprise a memory. The at least one processor may be implemented as at least one of processing devices such as an application specific integrated circuit (ASIC), a digital signal processor (DSP), a programmable logic device (PLD), a field programmable gate array (FPGA), a central processing unit (CPU), a microcontroller, and/or a microprocessor. The memory may be a non-transitory storage medium which stores instructions executed by the at least one processor. The memory may comprise at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), and an erasable and programmable ROM (EPROM).

When receiving the wake-up signal from the comparator 130, the controller 140 may be woken up from a sleep mode. When woken up, the controller 140 may perform failure diagnosis of the hydrogen storage system and may perform a fail-safe reaction of the diagnosed failure.

According to the exemplary embodiment described above, the apparatus 100 for monitoring the hydrogen storage system may apply a comparator (or a driving current of about 0.7 mA) rather than an existing hydrogen sensor (or a driving current of about 200 mA), thus implementing monitoring all the time at a power of a lower level than before (or a dark current level in the circuit). Thus, the apparatus 100 for monitoring the hydrogen storage system may always monitor a massive leak due to an operation of the TPRD or the like without including a separate power supply during parking or in a state where the controller 140 is turned off.

Figure 3:
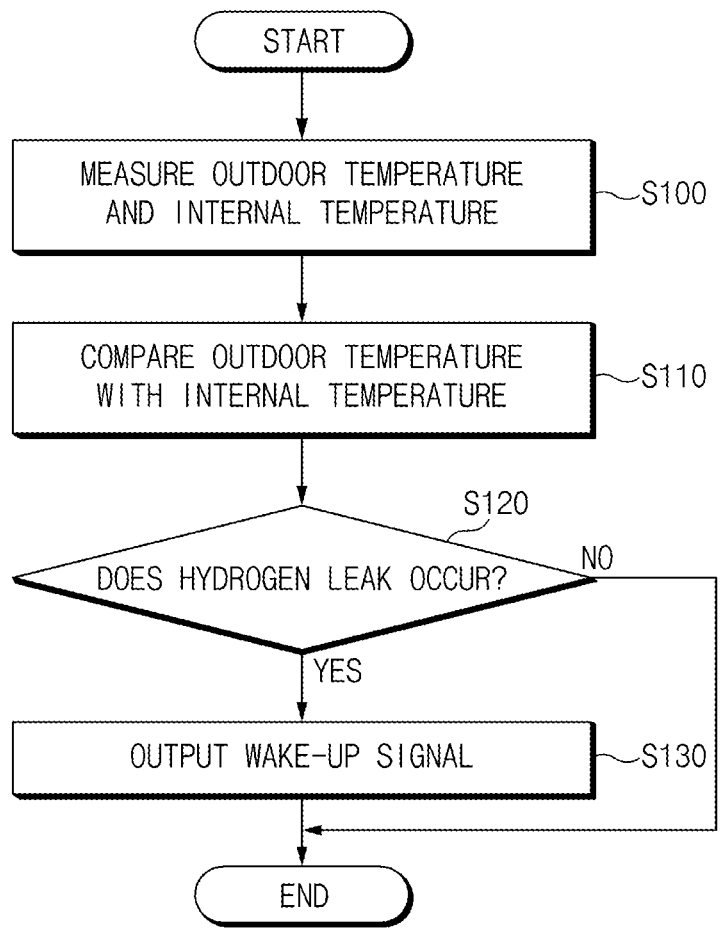
FIG. 3 is a flowchart illustrating a method for monitoring a hydrogen storage system according to exemplary embodiments of the present disclosure.

FIG. 3 is a flowchart illustrating a method for monitoring a hydrogen storage system according to exemplary embodiments of the present disclosure.

Referring to FIG. 3, in S100, a comparator 130 of an apparatus 100 for monitoring a hydrogen storage system in FIG. 1 may measure an outdoor temperature and an internal temperature. The comparator 130 may receive an internal temperature of a hydrogen tank, which is measured by a first temperature sensor 110 of FIG. 1. The comparator 130 may receive an outdoor temperature measured by a second temperature sensor 120 of FIG. 1.

In S110, the comparator 130 may compare the outdoor temperature with the internal temperature. The comparator 130 may calculate a temperature difference between the internal temperature and the outdoor temperature.

In S120, the comparator 130 may determine whether a hydrogen leak occurs based on the result of comparing the outdoor temperature with the internal temperature. As an example, when the compared result, that is, the temperature difference (or deviation) between the internal temperature and the outdoor temperature is generated above a predetermined temperature (e.g., 10° C.), the comparator 130 may determine that the hydrogen leak occurs. The predetermined temperature may be set based on a characteristic of an NTC element used to measure a temperature and an outdoor temperature in a polar region. When the temperature difference between the internal temperature and the outdoor temperature is less than the predetermined temperature, the comparator 130 may determine that the hydrogen leak does not occur. As another example, when the temperature difference between the internal temperature and the outdoor temperature is greater than three times the normal temperature deviation level, the comparator 130 may determine that the hydrogen leak occurs. The normal temperature deviation level may be a reference temperature deviation derived through an experiment in advance. When the temperature difference between the internal temperature and the outdoor temperature is less than or equal to three times the normal temperature deviation level, the comparator 130 may determine that the hydrogen leak does not occur.

When it is determined that the hydrogen leak occurs, in S130, the comparator 130 may output a wake-up signal to a controller 140 of FIG. 1. As an example, when the temperature difference between the internal temperature and the outdoor temperature is greater than or equal to the predetermined temperature, the comparator 130 may output the wake-up signal. As another example, when the temperature difference between the internal temperature and the outdoor temperature is greater than three times the normal temperature deviation level, the comparator 130 may output the wake-up signal.

Thereafter, when receiving the wake-up signal from the comparator 130, the controller 140 may be woken up to perform failure diagnosis and fail-safe functions.

Figure 4:
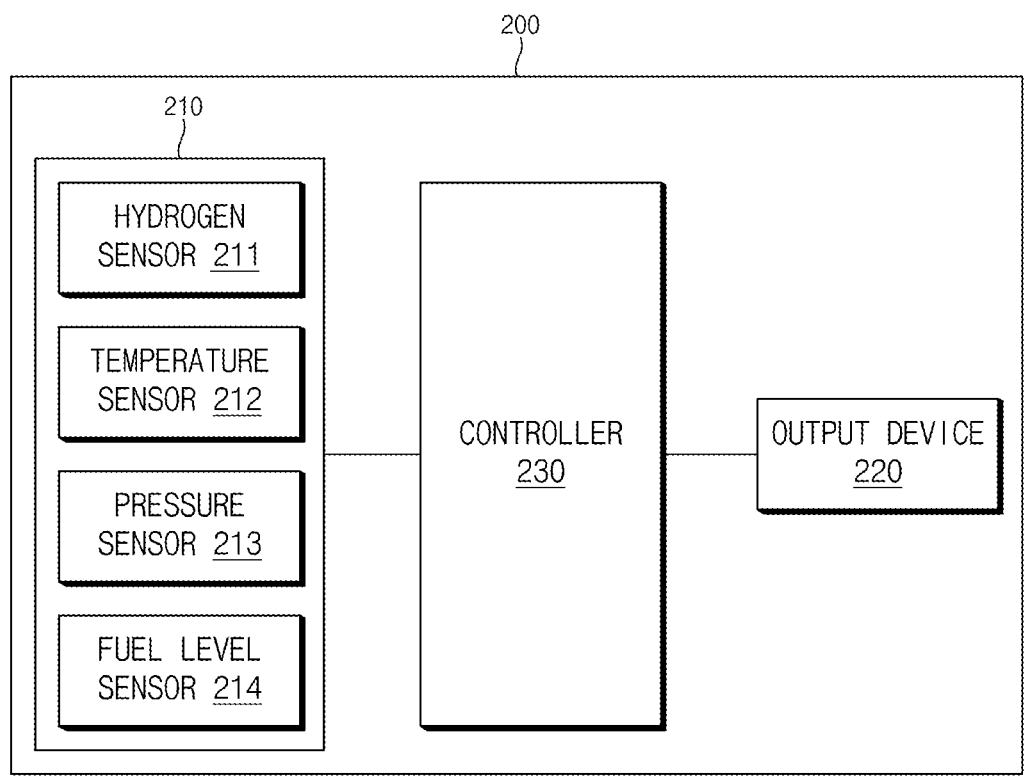
FIG. 4 is a block diagram illustrating a configuration of an apparatus for managing a hydrogen storage system according to exemplary embodiments of the present disclosure.

FIG. 4 is a block diagram illustrating a configuration of an apparatus for managing a hydrogen storage system according to exemplary embodiments of the present disclosure.

Referring to FIG. 4, an apparatus 200 for managing a hydrogen storage system may comprise a detector 210, an output device 220, and a controller 230.

The detector 210 may comprise a hydrogen sensor 211, a temperature sensor 212, a pressure sensor 213, a fuel level sensor 214, and the like, which may be installed in the hydrogen storage system. The detector 210 may monitor a state of the hydrogen storage system. The hydrogen sensor 211 may sense hydrogen which leaks from a hydrogen tank. The temperature sensor 212 may measure an internal temperature of the hydrogen tank. The pressure sensor 213 may sense an internal pressure of the hydrogen tank. The fuel level sensor 214 may measure the amount of remaining fuel (i.e., the amount of remaining hydrogen) in the hydrogen tank.

The output device 220 may output a failure diagnosis result such as a failure code and/or state information of the hydrogen storage system. For example, the output device 220 may notify a user of a failure diagnosis result and/or state information of the hydrogen storage system by means of a telematics system such as Bluelink. The output device 220 may comprise at least one of display devices such as a liquid crystal display (LCD), a thin film transistor-liquid crystal display (TFT-LCD), an organic light-emitting diode (OLED) display, a flexible display, a three-dimensional (3D) display, a transparent display, a head-up display (HUD), a touch screen, and a cluster. The output device 220 may comprise at least one of acoustic devices such as a receiver, a speaker, and a buzzer.

The controller 230 may correspond to a controller 140 shown in FIG. 1. The controller 230 may receive a wake-up signal from a comparator 130 of an apparatus 100 for monitoring a hydrogen storage system shown in FIG. 1. When receiving the wake-up signal, the controller 230 may be woken up from a sleep mode to be driven. When driven, the controller 230 may supply power to an electronic part in the hydrogen storage system. The controller 230 may perform detailed monitoring related to a leak (i.e., failure diagnosis).

The controller 230 may determine (or detect) whether hydrogen leaks from a hydrogen tank using the hydrogen sensor 211. The controller 230 may determine whether there is an abnormality in internal temperature and internal pressure of the hydrogen tank using the temperature sensor 212 and the pressure sensor 213. The controller 230 may determine whether a change in amount of remaining fuel occurs using the fuel level sensor 214. In other words, the controller 230 may detect whether there is a change in amount of remaining fuel in the hydrogen tank by means of the fuel level sensor 214.

When at least one of a hydrogen leak, an abnormality in temperature, an abnormality in pressure, or occurrence of a change in amount of remaining fuel is detected, the controller 230 may output the detected failure (or abnormality) as visual information and/or audible information to the output device 220. The controller 230 may store failure-related information in a memory. The controller 230 may prohibit a vehicle and/or a fuel cell system from starting.

When the hydrogen leak, the abnormality in temperature, the abnormality in pressure, and the change in amount of remaining fuel are not detected, the controller 230 may record a wake-up history (or information indicating whether the controller 230 is driven) in the memory. The controller 230 may switch an operation mode of the apparatus 200 for managing the hydrogen storage system from a wake-up mode to a sleep mode. In other words, when the hydrogen leak, the abnormality in temperature, the abnormality in pressure, and the change in amount of remaining fuel are not detected, the controller 230 may enter the sleep mode to wait.

Figure 5:
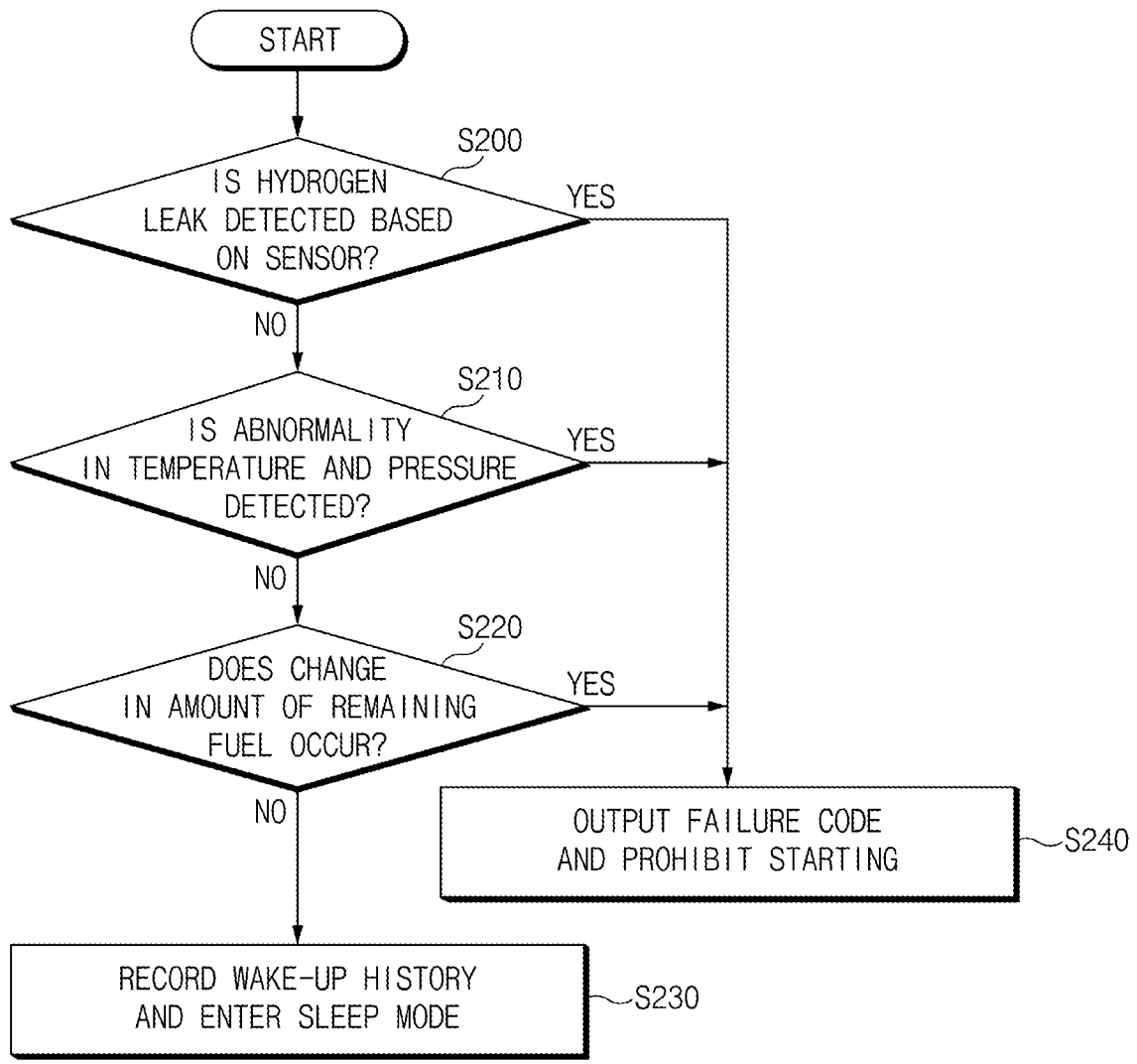
FIG. 5 is a flowchart illustrating a failure diagnosis process according to exemplary embodiments of the present disclosure.

FIG. 5 is a flowchart illustrating a failure diagnosis process according to exemplary embodiments of the present disclosure.

Referring to FIG. 5, in S200, a controller 230 of FIG. 4 may determine whether a hydrogen leak is detected based on a sensor when woken up. When receiving a wake-up signal from a comparator 130 shown in FIG. 1, the controller 230 may be woken up (or driven). The controller 230 may identify whether hydrogen leaks from a hydrogen tank using a hydrogen sensor 211 of FIG. 4.

When the hydrogen leak is not detected, in S210, the controller 230 may determine whether an abnormality in temperature and pressure in the hydrogen tank is detected. The controller 230 may measure a temperature and/or pressure in the hydrogen tank by means of a temperature sensor 212 and/or a pressure sensor 213 of FIG. 4 and may identify whether the measured temperature and/or pressure deviates from a reference temperature range and/or a reference pressure range. When the measured temperature and pressure deviates from the reference temperature range and/or the reference pressure range, the controller 230 may determine that the temperature and/or the pressure are/is abnormal.

When the abnormality in temperature and pressure is not detected, in S220, the controller 230 may determine whether a change in amount of remaining fuel occurs. When the abnormality in temperature and/or the abnormality in pressure and/is not detected, the controller 230 may identify whether the amount of change in amount of remaining fuel deviates from a predetermined permissible range.

When the change in amount of remaining fuel does not occur, in S230, the controller 230 may record a wake-up history and may enter a sleep mode. The controller 230 may measure the amount of hydrogen fuel (or the amount of remaining fuel) in the hydrogen tank using a fuel level sensor 214 of FIG. 4. The controller 230 may detect a change in amount of remaining fuel by measuring the amount of hydrogen fuel. When the change in amount of remaining fuel deviates from the predetermined permissible range, the controller 230 may determine that the change in amount of remaining fuel occurs.

When the hydrogen leak is detected in S200, when the abnormality in temperature and/or the abnormality in pressure are/is detected in S210, or when the change in amount of remaining fuel occurs in S220, in S240, the controller 230 may output a failure code corresponding to the detected abnormality to an output device 220 of FIG. 4 and may prohibit starting. The controller 230 may prohibit a vehicle and/or a fuel cell system from starting. The controller 230 may store information associated with the detected failure in a memory.

According to the exemplary embodiments described above, when detecting a hydrogen leak when the hydrogen leak occurs due to a TPRD, an apparatus 100 for monitoring a hydrogen storage system in FIG. 1 may interwork with the controller 230 to output information indicating the hydrogen leak in the form of being recognizable by a user. Furthermore, the apparatus 100 for monitoring the hydrogen storage system may perform a fail-safe function according to occurrence of leak by interworking with the controller 230, thus preventing a safety accident capable of occurring due to a hydrogen leak which occurs in a state where the controller 230 is not driven.

Figure 6:
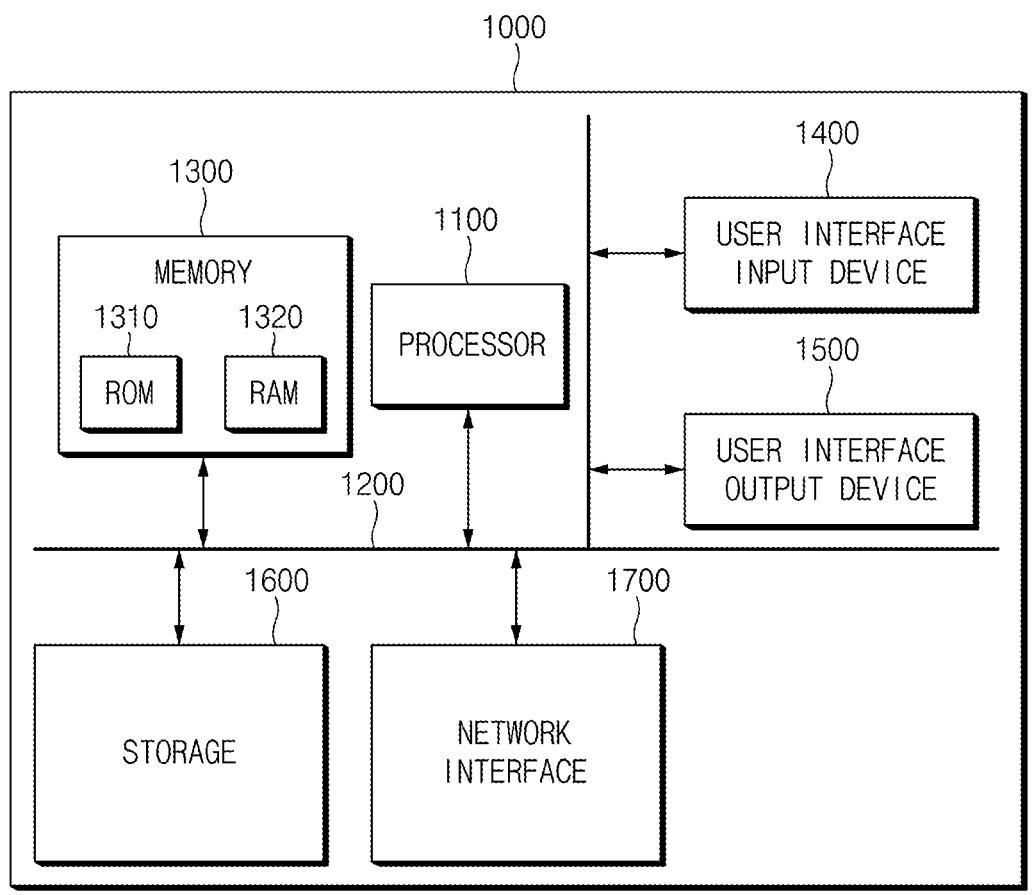
FIG. 6 is a block diagram illustrating a computing system for executing a method for monitoring a hydrogen storage system according to exemplary embodiments of the present disclosure.

FIG. 6 is a block diagram illustrating a computing system for executing a method for monitoring a hydrogen storage system according to exemplary embodiments of the present disclosure.

Referring to FIG. 6, a computing system 1000 may comprise at least one processor 1100, a memory 1300, a user interface input device 1400, a user interface output device 1500, storage 1600, and a network interface 1700, which may be connected with each other via a bus 1200.

The processor 1100 may be a central processing unit (CPU) or a semiconductor device that processes instructions stored in the memory 1300 and/or the storage 1600. The memory 1300 and the storage 1600 may comprise various types of volatile or non-volatile storage media. For example, the memory 1300 may comprise a read only memory (ROM) 1310 and a random access memory (RAM) 1320.

Thus, the operations of the method or the algorithm described in connection with the exemplary embodiments disclosed herein may be embodied directly in hardware or a software module executed by the processor 1100, or in a combination thereof. The software module may be configured to reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100. The processor 1100 may be configured to read out information from the storage medium and may write information in the storage medium. Alternatively, the storage medium may be integrated with the processor 1100. The processor 1100 and the storage medium may be configured to reside in an application specific integrated circuit (ASIC). The ASIC may reside within a user terminal. In another case, the processor 1100 and the storage medium may be configured to reside in the user terminal as separate components.

Exemplary embodiments of the present disclosure may always monitor an internal state of the hydrogen tank, thus detecting a massive hydrogen leak of the hydrogen tank due to the TPRD.

Furthermore, exemplary embodiments of the present disclosure may perform a fail-safe reaction when detecting the hydrogen leak due to the TPRD, thus ensuring safety.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, exemplary embodiments of the present disclosure are not intended to limit the technical spirit of the present disclosure, but are provided only for the illustrative purposes. The scope of the present disclosure should be construed on the basis of the accompanying claims, and all the technical ideas within the scope equivalent to the claims should be included in the scope of the present disclosure.

What is claimed is:

1. An apparatus for monitoring a hydrogen storage system, the apparatus comprising:
   a first temperature sensor configured to measure an internal temperature of a hydrogen tank;
   a second temperature sensor configured to measure an outdoor temperature;
   a comparator configured to determine that a hydrogen leak occurs when a temperature difference between the internal temperature and the outdoor temperature is greater than or equal to a predetermined temperature, and output a wake-up signal; and
   a controller configured to perform failure diagnosis and a fail-safe function of a diagnosed failure of the hydrogen storage system, when receiving the wake-up signal.

2. The apparatus of claim 1, wherein the comparator determines that the hydrogen leak occurs, when the temperature difference between the internal temperature and the outdoor temperature is greater than a certain factor times the predetermined normal temperature deviation.

3. The apparatus of claim 1, wherein the controller supplies power to an electronic part in the hydrogen storage system, when driven by the wake-up signal, and performs the failure diagnosis.

4. The apparatus of claim 1, wherein the controller detects at least one failure among: a leak of hydrogen of the hydrogen tank, an abnormality in temperature of the hydrogen tank, an abnormality in pressure of the hydrogen tank, or occurrence of a change in amount of remaining fuel of the hydrogen tank using sensors, when performing the failure diagnosis.

5. The apparatus of claim 4, wherein the controller outputs information associated with the detected failure, when detecting the failure, and prohibits a vehicle from starting.

6. The apparatus of claim 4, wherein the controller records a wake-up history, when not detecting the failure, and enters a sleep mode.

7. The apparatus of claim 1, wherein each of the first temperature sensor and the second temperature sensor comprises a negative temperature coefficient (NTC) element.

8. A method for monitoring a hydrogen storage system, the method comprising:
    measuring, by a comparator, an internal temperature of a hydrogen tank and an outdoor temperature using a first temperature sensor and a second temperature sensor;
    comparing, by the comparator, the internal temperature with the outdoor temperature;
    determining, by the comparator, that a hydrogen leak occurs when a temperature difference between the internal temperature and the outdoor temperature is greater than or equal to a predetermined temperature;
    outputting, by the comparator, a wake-up signal to a controller, when it is determined that the hydrogen leak occurs;
    performing, by the controller, failure diagnosis of the hydrogen storage system; and
    performing, by the controller, a fail-safe function of a diagnosed failure of the hydrogen storage system after receiving the wake-up signal.

9. The method of claim 8, wherein the determining that the hydrogen leak occurs comprises:
    determining, by the comparator, that the hydrogen leak occurs, when the temperature difference between the internal temperature and the outdoor temperature is greater than a certain factor times the predetermined normal temperature deviation.

10. The method of claim 8, wherein the performing of the failure diagnosis comprises:
    supplying, by the controller, power to an electronic part in the hydrogen storage system, when the controller is driven by the wake-up signal, and performing, by the controller, the failure diagnosis.

11. The method of claim 8, wherein the performing of the failure diagnosis comprises:
    detecting, by the controller, at least one failure among: a leak of hydrogen of the hydrogen tank, an abnormality in temperature of the hydrogen tank, an abnormality in pressure of the hydrogen tank, or occurrence of a change in amount of remaining fuel of the hydrogen tank using sensors; and
    outputting, by the controller, information associated with the detected failure and prohibiting, by the controller, a vehicle to start.

12. The method of claim 11, wherein the performing of the failure diagnosis further comprises:
    recording, by the controller, a wake-up history, when the controller does not detect the failure, and entering, by the controller, a sleep mode.

* * * * *